Patented June 28, 1949

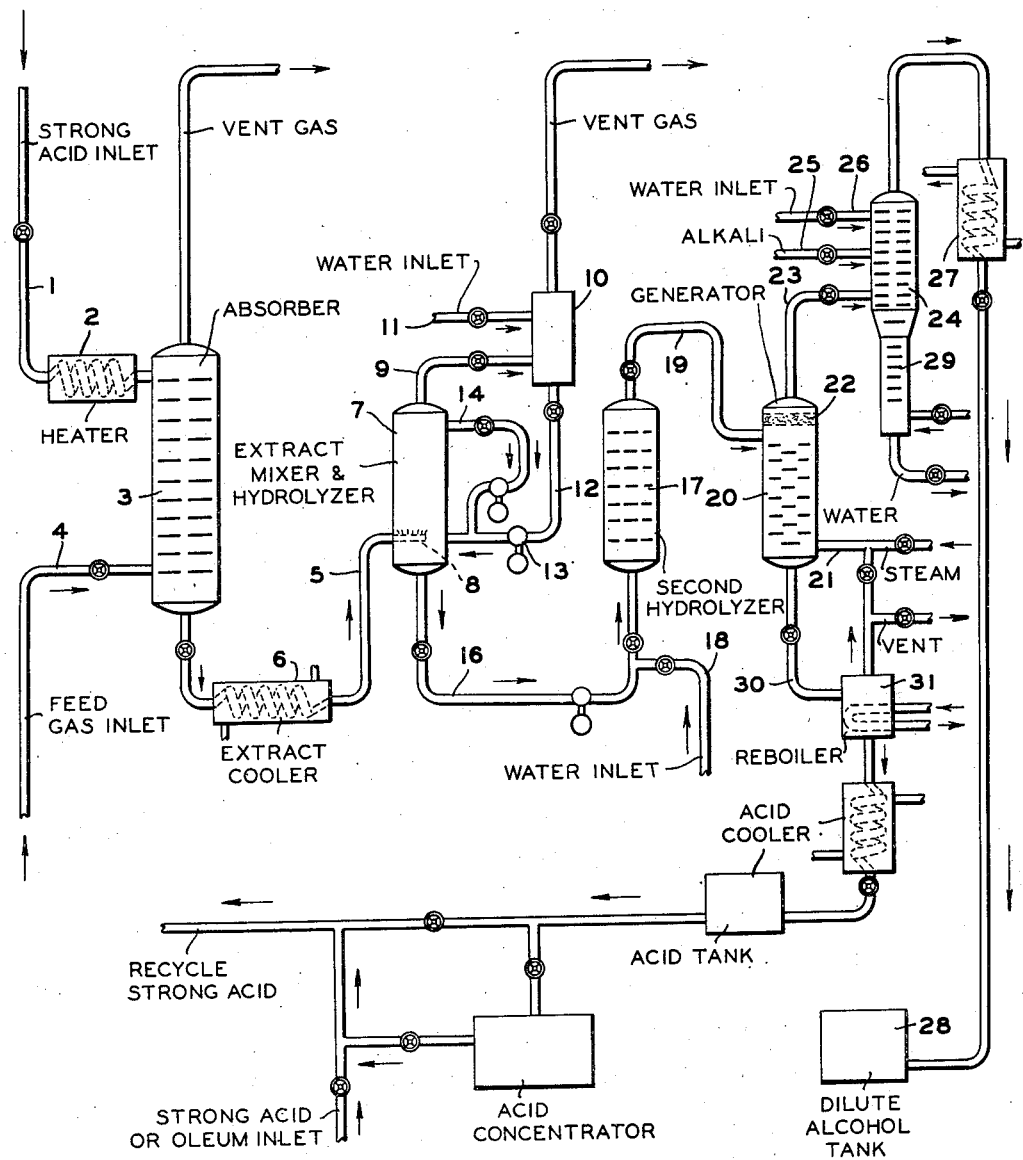

2,474,568

UNITED STATES PATENT OFFICE 2,474,568

DILUTION AND HYDROLYSIS OF DIETHYL SULFATE SOLUTIONS

Lewis A. Bannon, Baton Rouge, La., and Charles E. Morrell, Westfield, N. J., assignors to Standard Oil Development Company, a corporation of Delaware Application June 11, 1946, Serial No. 676,078

9 Claims. (Cl. 260—639)

This invention relates to the production of alcohols by hydrolysis of sulfuric acid extracts of normally gaseous olefins, and is particularly applicable to the preparation of pure ethyl alcohol.

When olefins such as ethylene are absorbed in strong sulfuric acid, the resulting solution contains ethyl hydrogen sulfate, sulfuric acid, and also diethyl sulfate and ethyl alcohol. The composition approaches equilibrium which varies with the acid strength. Under the conditions normally used for absorbing ethylene in strong sulfuric acid of about 90 to 100 weight percent concentration, the resulting solution will contain a substantial proportion of diethyl sulfate. This compound (B. P. 208° C.) is volatile with steam, hence is carried overhead in steam stripping of alcohol from the partially hydrolyzed extract. It is an objectionable impurity in the resulting alcohol, as it liberates sulfuric acid by hydrolysis, causing corrosion and imparting a bad odor to the alcohol. Hence, it is desirable to remove diethyl sulfate as completely as possible from the acid extract before distilling off the alcohol. This is normally attempted by hydrolysis, but such continuous operations as have heretofore been described either involve incomplete hydrolysis of the diethyl sulfate, or else involve excessive formation of diethyl ether. For example, when the hydrolysis is conducted by passing water and acid extract continuously into a hydrolyzer with mixing, and withdrawing to a steam stripper a continuous stream of the hydrolyzed material, the latter will always contain some diethyl sulfate, even though a very long residence time is permitted in the hydrolyzer. If the mixer is operated batchwise, and a sufficiently long time is permitted to hydrolyze the diethyl sulfate completely, very large equipment is required. In both operations the formation of ether is excessive, as the following reactions occur:

(1) 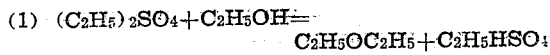

(2) $C_2H_5HSO_4 + C_2H_5OH = C_2H_5OC_2H_5 + H_2SO_4$

Hence, it has been found desirable to limit the time during hydrolysis in which substantial concentrations of diethyl sulfate and ethyl alcohol are permitted to be in contact with each other, in order to avoid reaction 1.

The desired reactions in hydrolysis of the extract are:

(3) 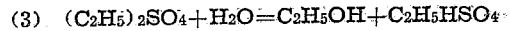

(4) 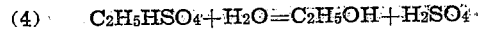

Reactions 3 and 1 have been found to be much more rapid than 2 or 4 in 40–55% acid at temperatures below about 90° C. In the two-stage hydrolysis of the diethyl sulfate according to this invention, it is accordingly possible to carry reaction 3 to virtual completion before 4 can contribute large concentrations of alcohol for reaction 1. In this manner, formation of ether from the diethyl sulfate is greatly suppressed. Also, reaction 2 greatly limits the time permitted for the hydrolysis of the ethyl sulfate and for this reason it has been proposed that this reaction be carried out by feeding the extract to a tower countercurrent to stripping steam, which removes the alcohol as fast as it is formed. However, as indicated above, such extract fed to the tower must be substantially free of diethyl sulfate in order to keep this volatile compound out of the alcohol distillate.

It has also been found that the hydrolysis of the diethyl sulfate in the original acid extract can be carried out much more completely than heretofore possible by the use of two separate hydrolysis zones prior to the steam stripper and preferably by providing for stream-line flow of extract through at least the second of these zones. Under such conditions a major portion, and preferably about 75 to 90% of the diethyl sulfate is hydrolyzed in the first zone, for which a conventional mixing autoclave may be used, and the final hydrolysis is conducted in a second stage in which preferably no mixing of the feed stream with the outlet stream is permitted. This second stage hydrolysis is preferably carried out in a tower or pipe coil of relatively small diameter compared to its length, in order to prevent by-passing. It may also be conducted in vessels suitably provided with baffles to divide the reaction space into a number of separate zones and to cause the extract to flow progressively through these zones with no by-passing from initial to final zones and vice versa.

The drawing is a diagrammatic illustration in partial sectional elevation of one suitable type of equipment for carrying out the process of this invention, and indicates the flow of materials. Suitable conditions for the various absorption, hydrolysis and distillation operations are also given in the following detailed description, which is presented for purpose of illustration and not in limitation of this invention.

Referring to the drawing, strong sulfuric acid of about 90–100% concentration, preferably 96–100%, is passed by line 1 through heater 2 into the upper portion of an absorption tower 3 at a temperature of about 40 to 50° C. A feed gas containing ethylene such as a C2 fraction of gas obtained by cracking gas oil at temperatures of about 650 to 760° C. in the presence of steam and containing 25 to 50% ethylene, is passed by line 4 into the lower portion of the tower 3 at a pressure of about 400 to 500 pounds per square inch. The tower contains suitable bubble trays or other packing for providing intimate liquid-gas contact and is also provided with suitable heat exchangers (not shown) distributed throughout the tower to remove the heat of reaction and to maintain the temperature in the tower at about 70 to 85 or 90° C.

Under such conditions more than 90% of the ethylene is dissolved in the resulting acid extract which contains about 1.3 mols of ethylene per mol of sulfuric acid, of which about ⅔ is in the form of diethyl sulfate. This extract is removed from the absorber by line 5 and is passed through cooler 6 and then, at a temperature of about 45° C., into an extract mixer and first hydrolysis stage 7, suitably by a number of jets 8 arranged on the extract feed pipe in order to provide thorough mixing in this hydrolyzer, which is maintained at a pressure of about 50 pounds per square inch gauge and at a temperature of about 80 to 90° C.

The physically dissolved gases which are released from the extract in this mixer due to the reduction in pressure are vented from the upper portion of the vessel 7 through line 9 and are washed in the vent gas scrubber 10 with water supplied by line 11, this water then being passed by line 12 and pump 13 into the vessel 7 in order to dilute the extract therein. Sufficient water is supplied to maintain a sulfuric acid concentration in this first hydrolyzer of about 40 to 55 weight percent (hydrocarbon-free basis). That is, the weight percent of sulfuric acid is calculated on the basis of the total equivalent weights of sulfuric acid and water present in free and combined form, the hydrocarbon content of the extract being excluded from this calculation. It is desirable to obtain rapid and uniform mixing of the extract with the dilution water in the vessel 7; this may be aided by recycling extract by means of line 14 and pump 15 or by stirrers suitably disposed in the vessel 7. The recycled extract may be mixed with fresh extract in line 5 or with the dilution water in line 12. A sufficient residence time is allowed in the vessel 7 for the hydrolysis of the major portion of the entering diethyl sulfate. The resulting diluted and partly hydrolyzed extract existing in this vessel then has sufficient solubility for the entering diethyl sulfate that its precipitation as a separate phase is avoided. This expedites the hydrolysis reaction and reduces the mixing problem. A residence time in this zone of about 10 to 20 minutes, preferably about 14 to 17 minutes, with temperatures maintained at 80 to 90° C. (the time being inversely related to the temperature) will be found sufficient to accomplish the desired hydrolysis of the diethyl sulfate. This will vary somewhat with the concentration of the extract.

The resulting partly hydrolyzed extract, which still contains about 4 to 6% of its sulfate components in the form of diethyl sulfate, is withdrawn by line 16 and is passed through a second hydrolysis zone 17 which may suitably be in the form of a long narrow cylinder or tower containing suitably disposed baffles to prevent internal recirculation and mixing of the streams entering and leaving this vessel. The second hydrolysis zone may also be in the form of a long pipe or pipe coil suitably designed to accomplish the same purpose of preventing internal mixing or turbulence over more than a limited portion of its length. This avoidance of internal circulation in this zone is important in order to obtain a hydrolyzed extract free of diethyl sulfate. Additional water to further dilute the extract to a sulfuric acid concentration of about 40 to 45 weight percent (hydrocarbon-free basis) may be added by line 18. This second hydrolysis zone 17 is preferably maintained at a temperature between about 80 and 90 or 95° C. with sufficient residence time for the extract therein to permit substantially complete hydrolysis of the entering diethyl sulfate. This time is suitably about 20 to 30 minutes, depending upon the temperature of the vessel 17 and the diethyl sulfate content of the extract supplied thereto. This time does not require particularly close control because of the low concentration of diethyl sulfate present.

The resulting extract, substantially free of diethyl sulfate and containing ethyl hydrogen sulfate and ethyl alcohol, is passed by line 19 to a suitable alcohol generator 20 in which the extract is stripped with steam or other suitable gases for distilling off the ethyl alcohol. The generator 20 also acts as a third hydrolysis zone in which the hydrolysis of ethyl hydrogen sulfate is completed. In order to reduce ether formation, it is desirable to remove the alcohol from the extract as rapidly as possible, as by stripping the extract in a tower countercurrent to steam. The tower 20 contains suitable packing or distributing plates for providing intimate liquid-gas contact between the down-flowing extract and steam which is supplied to the lower portion of the tower by line 21. The steam-alcohol vapor mixture leaves the top of the tower through a dephlegmator 22 and then is passed by line 23 into a scrubbing tower 24 in which it is scrubbed first with aqueous alkali supplied by line 25 and then with water supplied by line 26. The vapors leaving tower 24 are condensed in cooler 27 and the resulting dilute alcohol condensate is received in drum 28 from which it may be concentrated by any suitable method. This aqueous alcohol will be found to be free of diethyl sulfate and of mineral acid and to contain very small amounts of ether. It can be readily concentrated to provide alcohol of extremely high purity and good odor. Loss of alcohol in the scrubbing water in tower 24 is prevented by supplying stripping steam to a lower stripping section 29 of this tower.

The stripped and diluted sulfuric acid leaves the bottom of generator 20 by line 30 and may be concentrated and, if desirable, recycled to the absorber by any suitable method. For example, it may be passed into a reboiler 31 in which it is heated by "Dowtherm" or other indirect means to a temperature sufficient to concentrate it to about 65 to 70 weight percent sulfuric acid. This acid may then be further concentrated in a vacuum concentrator and may be recycled to the absorber, with or without such concentration, and with suitable fortification with fresh concentrated acid or oleum.

The composition of the sulfuric acid-ethylene extract varies considerably with the operating conditions such as acid strength, temperature, degree of contact and ethylene pressure. However, in all such cases in which there is any substantial concentration of ethylene in the extract, for example, from about 0.5 or 1.0 to 2.0 mols of ethylene per mol of sulfuric acid "extract saturation," there is also present diethyl sulfate in sufficient amounts so that the two-stage hydrolysis of the diethyl sulfate, described above, will be found advantageous prior to separation of ethyl alcohol from the extract.

The following example is representative of extract compositions obtained in carrying out this invention with a fresh rich extract prepared with 98% sulfuric acid and containing 1.3 to 1.4 mols of ethylene absorbed per mol of sulfuric acid. The concentration of esters in this extract reported as mol percent of total sulfate radical, is as follows for a specific example (A) and for a representative range (B):

|  | A | B |
|---|---|---|
| $Et_2SO_4$ | 43 mol. percent | (39–47) |
| $EtHSO_4$ | 40 mol. percent | (33–48) |

This extract is passed continuously at 80 to 90° C. into a first hydrolysis zone to which water is separately added in a continuous stream in the manner described above in an amount sufficient to dilute the extract to 45% strength sulfuric acid (hydrocarbon-free basis). The residence time of the extract in this first hydrolysis zone is 16 to 17 minutes at 80° C. or about 14 minutes at 90° C. The partly hydrolyzed extract stream leaving this hydrolyzer has the following composition reported as mol percent of total sulfate radical present:

| | Per cent |
|---|---|
| $Et_2SO_4$ | 4 to 6 |
| $EtHSO_4$ | 31 to 57 |

This stream is then passed through a second hydrolyzer maintained at 80 to 90° C., without internal recirculation, for a residence time of 20 to 30 minutes. The exit stream, containing no appreciable diethyl sulfate, but still containing large amounts of ethyl hydrogen sulfate, is passed to a stripping column where alcohol is removed by countercurrent stripping with steam. The resulting alcohol distillate is free of diethyl sulfate and contains not more than 5 to 7 volume percent of ethyl ether (based on product alcohol), of which about 2% is formed in the absorber and not more than 5% is formed in the hydrolysis and stripping stages.

When operating in the same manner, except that only a single hydrolysis stage is used for complete hydrolysis of the diethyl sulfate, the formation of ether in the hydrolysis is about 15 volume percent, based on the product alcohol obtained.

It is to be understood that the specific examples are presented herein for the purpose of illustrating suitable methods for carrying out this invention and that it is desired to claim this invention as broadly as the prior art permits.

We claim:

1. An improved process for the preparation of ethyl alcohol from a solution of diethyl sulfate in strong sulfuric acid, comprising diluting said solution with water to a 40–55 weight percent (hydrocarbon-free basis) sulfuric acid concentration and hydrolyzing the major portion, but not all, of said diethyl sulfate in a first hydrolysis zone maintained at a temperature of 80–90° C., withdrawing a stream of the resulting partly hydrolyzed solution from said first hydrolysis zone and passing it through a second hydrolysis zone maintained at a temperature between 80 and 95° C., providing sufficient residence time in said second zone for substantially complete hydrolysis of remaining diethyl sulfate, then stripping alcohol from the stream leaving said second zone by contact with steam.

2. Process according to claim 1, in which the time of residence in said second hydrolysis zone is about 20 to 30 minutes.

3. Process according to claim 1, in which the time of residence in the first hydrolysis zone is about 14 to 17 minutes.

4. In the preparation of ethyl alcohol by hydrolysis of a solution containing diethyl sulfate and prepared by absorbing ethylene in sulfuric acid of 90–100% strength in a proportion of 1 to 2 mols of dissolved ethylene per mol of sulfuric acid, an improved method for reducing the amount of diethyl sulfate and ethyl ether in the resulting ethyl alcohol, comprising passing a stream of said solution into a first hydrolysis zone, adding water to said zone to dilute the solution to a 40–55 weight percent (hydrocarbon-free basis) sulfuric acid concentration, maintaining said zone at a temperature of 80–90° C., providing a residence time in said zone sufficient to hydrolyze about 75 to 90% of said diethyl sulfate, withdrawing a stream of the partly hydrolyzed solution from said zone and passing it in substantially stream-line flow through an elongated second hydrolysis zone maintained at a temperature of 80 to 90° C., providing a sufficient resident time in said second zone for substantially complete hydrolysis of diethyl sulfate, then stripping alcohol from the stream leaving said second zone by contact with steam.

5. Process according to claim 4, in which the stream leaving the first hydrolysis zone contains about 4 to 6% of diethyl sulfate based on the total sulfate content of the solution.

6. Process according to claim 4, in which the time of residence in said second hydrolysis zone is about 5 to 30 minutes.

7. An improved continuous process for the preparation of ethyl alcohol from a solution containing diethyl sulfate and prepared by absorbing ethylene in sulfuric acid of 90–100 weight percent concentration in a proportion of 1 to 2 mols of ethylene per mol of sulfuric acid, comprising passing a stream of said solution into a first hydrolysis zone, separately adding water to said zone to maintain therein 40–55 weight percent (hydrocarbon-free basis) sulfuric acid, maintaining said zone at a temperature of 80–90° C. with mixing to provide a substantially uniform composition throughout said zone, providing a residence time in said zone sufficient to hydrolyze about 75 to 90% of said diethyl sulfate, withdrawing a stream of the resulting partly hydrolyzed solution from said zone and passing it in substantially stream-line flow through an elongated second hydrolysis zone maintained at a temperature of 80 to 90° C., providing a residence of about 20 to 30 minutes in said second zone for substantially complete hydrolysis of diethyl sulfate, then stripping alcohol from the stream leaving said second zone by contact with steam.

8. Process according to claim 7, in which the stream leaving said first hydrolysis zone contains about 4 to 6% of diethyl sulfate based on the total sulfate content of the solution.

9. An improved process for the preparation of ethyl alcohol from a solution containing diethyl sulfate and prepared by absorbing ethylene in concentrated sulfuric acid comprising passing the said solution through a first dilution and hydrolysis zone in which the solution is diluted with water to about 40–55 weight percent (hydrocarbon-free basis) sulfuric acid concentration and in which the temperature and time of residence are controlled to hydrolyze a major portion, but not all, of said diethyl sulfate, then passing the solution through a second hydrolysis zone in which temperature and time of residence are controlled to hydrolyze the remainder of said diethyl sulfate until a substantial concentration of ethyl hydrogen sulfate is left in said solution, then passing the solution to a third hydrolysis and distillation zone in which the hydrolysis of the ethyl hydrogen sulfate is completed and the ethyl alcohol formed is distilled from the diluted acid.

LEWIS A. BANNON.
CHARLES E. MORRELL.

REFERENCES CITED

The following references are of record in the file of this patent:

UNITED STATES PATENTS

| Number | Name | Date |
| --- | --- | --- |
| 2,013,453 | Stuart | Sept. 3, 1935 |
| 2,045,616 | Sargent | June 30, 1936 |
| 2,096,878 | Brooks | Oct. 26, 1937 |
| 2,414,759 | Mottern | Jan. 21, 1947 |